United States Patent [19]

Delaney, III et al.

[11] Patent Number: 5,712,477

[45] Date of Patent: Jan. 27, 1998

[54] SYSTEM TO PROVIDE ALIGNMENT AND TROUBLESHOOTING AID PHOTOELECTRIC SENSORS THROUGH ALTERNATING NUMERIC DISPLAY

[75] Inventors: Patrick J. Delaney, III, Sudbury; Elik L. Fooks, Lexington, both of Mass.

[73] Assignee: Allen-Bradley Company, Inc., Milwaukee, Wis.

[21] Appl. No.: 647,500

[22] Filed: May 14, 1996

[51] Int. Cl.$^6$ ............................................. G01V 9/04
[52] U.S. Cl. ................................. 250/221; 250/222.1
[58] Field of Search ......................... 250/221, 222.1, 250/214 R, 215, 206.1; 340/555, 556, 557

[56] References Cited

U.S. PATENT DOCUMENTS

| | | | |
|---|---|---|---|
| 3,832,056 | 8/1974 | Shipp et al. | 250/221 |
| 3,889,118 | 6/1975 | Walker | 250/221 |
| 4,498,002 | 2/1985 | Tekirdaglis | 340/555 |
| 4,626,683 | 12/1986 | Van Zeeland | 250/221 |
| 5,218,106 | 6/1993 | Fooks et al. | 250/221 |
| 5,336,882 | 8/1994 | Fooks et al. | 250/221 |
| 5,347,117 | 9/1994 | Fooks et al. | 250/221 |

*Primary Examiner*—Stephone B. Allen
*Attorney, Agent, or Firm*—John M. Miller; John J. Horn

[57] ABSTRACT

A method and apparatus for alternately displaying status information in an photoelectric detection unit. The apparatus comprising an LCD display capable of displaying numerical information and alternately providing target and background margin information in a periodic fashion which is decoupled from the target or process speed. The method further comprising the steps of first displaying either target or background margin information and second displaying the margin information not displayed in the first step. The apparatus and method further comprising a diagnostic capability or step which identifies when the photoelectric detection unit is operating near the fringe or beyond the range of acceptable operating parameters and providing information as to the cause for any degradation of the operating conditions.

10 Claims, 5 Drawing Sheets

FIG. 5
MARGIN ROUTINE

SYSTEM TO PROVIDE ALIGNMENT AND TROUBLESHOOTING AID PHOTOELECTRIC SENSORS THROUGH ALTERNATING NUMERIC DISPLAY

FIELD OF THE INVENTION

The present invention relates to photoelectric detectors and more particularly to a method and apparatus for alternately displaying target and background information in photoelectric control units which periodically transmit light pulses and synchronously detect return pulses.

BACKGROUND OF THE INVENTION

In the past, photoelectric control units have included static displays having the capability of changing their output only in synchronism with the process being detected or when acted upon by an operator. In particular, U.S. Pat. Nos. 5,281,810, 5,324,931, 5,336,882, and 5,347,117, assigned to Allen-Bradley Corporation, Inc. of Milwaukee, Wis. and hereby incorporated by reference disclose a photoelectric control unit including a single static LCD display comprising a transreflective TNFE liquid crystal display capable of displaying numeric information and a plurality of icons to provide useful information about the unit's current settings or the conditions under which it is operating. As a result, the photoelectric control units disclosed in the above mentioned patents provided information and flexibility such that they could be employed in a user friendly manner in different operating environments and provide information which could be used to align the unit. Specifically, the inventions disclosed in the above-mentioned patents provide a method and apparatus for accurately calculating both target and background operating margins. However, at times it is desirable to view more than one operating parameter on a regular basis without performing any action upon the unit. For example, both background and target margins are useful at regular intervals when aligning the photoelectric control unit. Importantly, the regular intervals must be distinguishable by an operator. Thus in high speed applications the regular intervals must be decoupled from the process speed. Additionally, a method and apparatus for compiling background and target information during the intervals is required. However, the prior art units provided a single static display which displays only one numeric operating parameter until acted upon by an operator.

It is therefore an object of the present invention to provide a photoelectric control unit having an operator interface which alternately shows the average target signal strength followed by the average background signal strength.

It is another object of the present invention to provide a photoelectric control unit having an operator interface with an alternating display which is decoupled from the target or process speed.

It is a further object of the present invention to provide a photoelectric control unit which is capable of identifying poor operating conditions which may lead to unreliable operation.

It is yet a further object of the present invention to provide a photoelectric control unit which is flexible in operation, provides useful information to its operator, is otherwise reliable in operation and can be produced at a reasonable cost.

SUMMARY OF THE INVENTION

The dynamic diagnostic display of the present invention offers an alternative to a static margin display via a method and apparatus for displaying average target and background margins at a rate that is decoupled from the process rate and thus more suitable for human viewing, especially in high speed applications. Additionally, the present invention provides a method and apparatus for displaying diagnostic information indicative of poor operating conditions.

The photoelectric control unit of the present invention comprises an operator interface which is capable of alternately displaying an average target margin and an average background margin at a predetermined rate. In general, the photoelectric control unit of the present invention is adapted for periodically transmitting light pulses and synchronously detecting return pulses having a special system architecture comprising variable gain modules for determining operating margin, an operator interface having multiple functions for enabling operator control over the unit's electronic system, a target acquisition system and a system for providing an alternating display of operating margins which is decoupled from the process speed.

The system architecture includes two signal channels each of which receives and amplifies the output from the system photodetector and includes a comparator for separately comparing the signal levels on both channels with a common reference level. However, the second signal channel includes a variable gain module which allows the gain on this channel to be adjusted to assume any of a number of different values. Operating margin is determined by adjusting the gain on the second signal channel until the comparator installed on this channel switches state and comparing the gain level at which this occurs with the gain level at which the first signal channel is operating. In the preferred embodiment, a variable gain module in also installed in the signal path leading from the photodetector to both signal channels for decreasing or throttling down the main gain level and increasing the range over which operating margins can be determined.

The operator interface includes a plurality of display icons each of which corresponds to one or more control functions. These icons are displayed in conjunction with the selection and operation of the control functions. The interface also includes a numerical display for displaying numerical values in conjunction with icons and for assisting in the selection of control parameters. Furthermore, in the preferred embodiment, the numerical display is operative for alternately displaying a target and background operating margins as an aide in mechanical alignment of the photoelectric control unit.

DESCRIPTION OF THE PREFERRED EMBODIMENT

Figure 1:
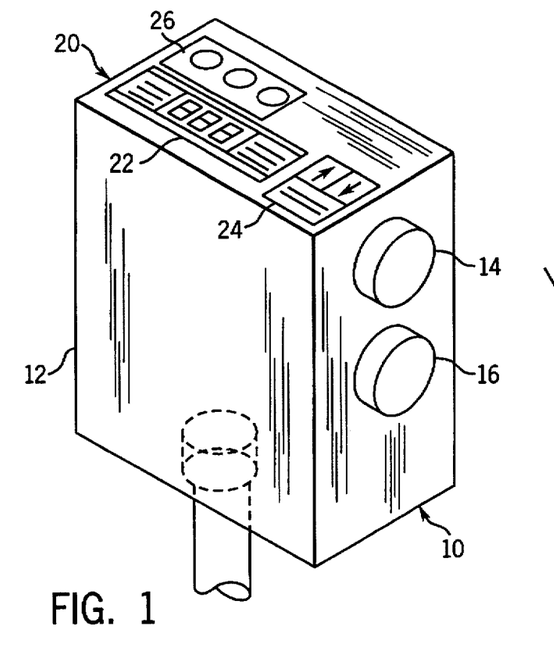
FIG. 1 provides an elevated perspective view of a photoelectric control unit showing an operator interface on the top surface of the unit in accordance with the preferred embodiment of the present invention.

Referring now to FIG. 1, a photoelectric control unit 10 is shown having a housing 12 for containing electrical and optical components and a pair of lenses 14 and 16 for directing optical output and collecting optical input. The photoelectric control unit 10 also includes an operator interface panel 20 having an informational display 22 and an input keypad 24.

Figure 2:
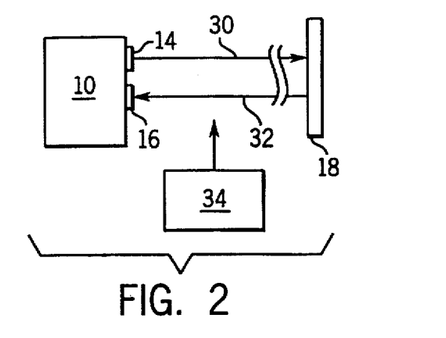
FIG. 2 provides a block diagram illustrating the operation of a photoelectric control unit in a retro-reflective mode in accordance with the preferred embodiment of the present invention.

Referring now to FIG. 2, the photoelectric control unit 10 can be configured for transmitting a light beam 30 of light pulses out from the lens 14 to a reflector 18 which directs a light beam of reflected light pulses 32 to the lens 16 for synchronous detection of the return pulses by the electronic components of the unit 10. The light beams 30 and 32 define an optical path between the photoelectric control unit 10 and the reflector 18. When a target object 34 to be detected passes between the photoelectric control unit 10 and the reflector 18 the optical path is broken and the control unit senses the presence of the object 34 and generates an output signal indicative of the presence of the target object. It should, however, be understood that the photoelectric control unit 10 can operate in a number of different configurations such as the "retro-reflective" configuration described above or, for example, by "through beam" detection or by "diffuse proximity" sensing of light reflected off of objects to be detected.

Figure 3:
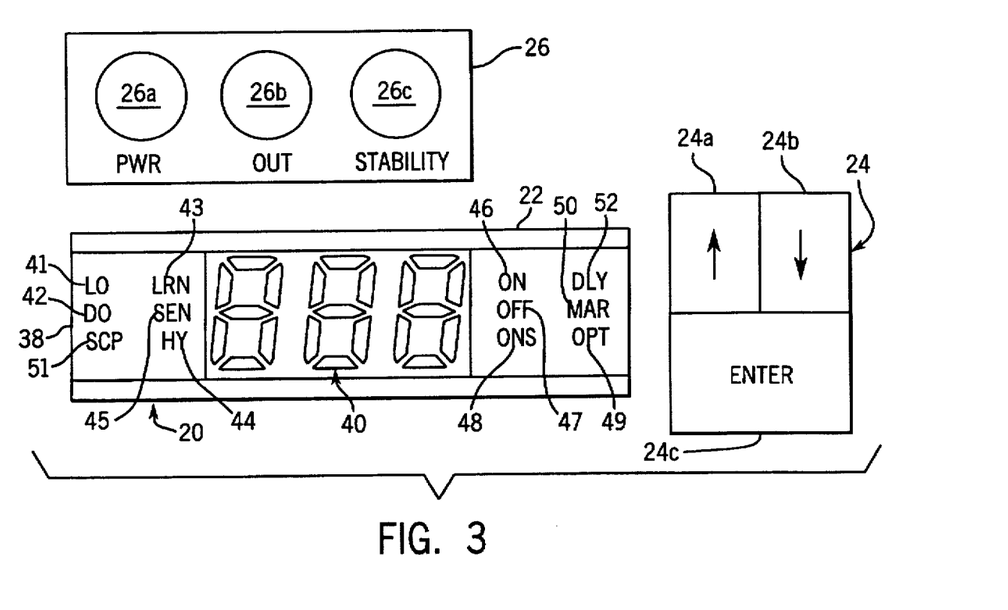
FIG. 3 provides a plan view of the operator interface for use in conjunction with a photoelectric control unit in accordance with the preferred embodiment of the present invention.

Referring now to FIG. 3, the operator interface panel 20 is shown as including a transreflective TNFE liquid crystal display 22 featuring a three-digit numerical display 40, although the present invention is intended to operate with any numeric type display. The displays 22 also includes twelve display icons 41–52 providing a graphical style interface for displaying control information and a LED for providing back lighting. A keypad 24 includes three separate input keys 24a, 24b and 24c corresponding to up, down and enter actions respectively. A display 26 includes three separate LEDs 26a, 26b and 26c which indicate when power is applied to the control unit 10, when the control unit 10 is providing output and when a photoelectric stability figure for the control unit 10 is greater than a fixed threshold and when unstable margin exists, respectively. The icons 41–52 operate in conjunction with the keys 24a–24c to allow the operator to readily select a number of different control options associated with the photoelectric control unit 10. The icons 41–52 and their corresponding operational functions and menu categories are described in the incorporated U.S. patents mentioned above.

Figure 4:
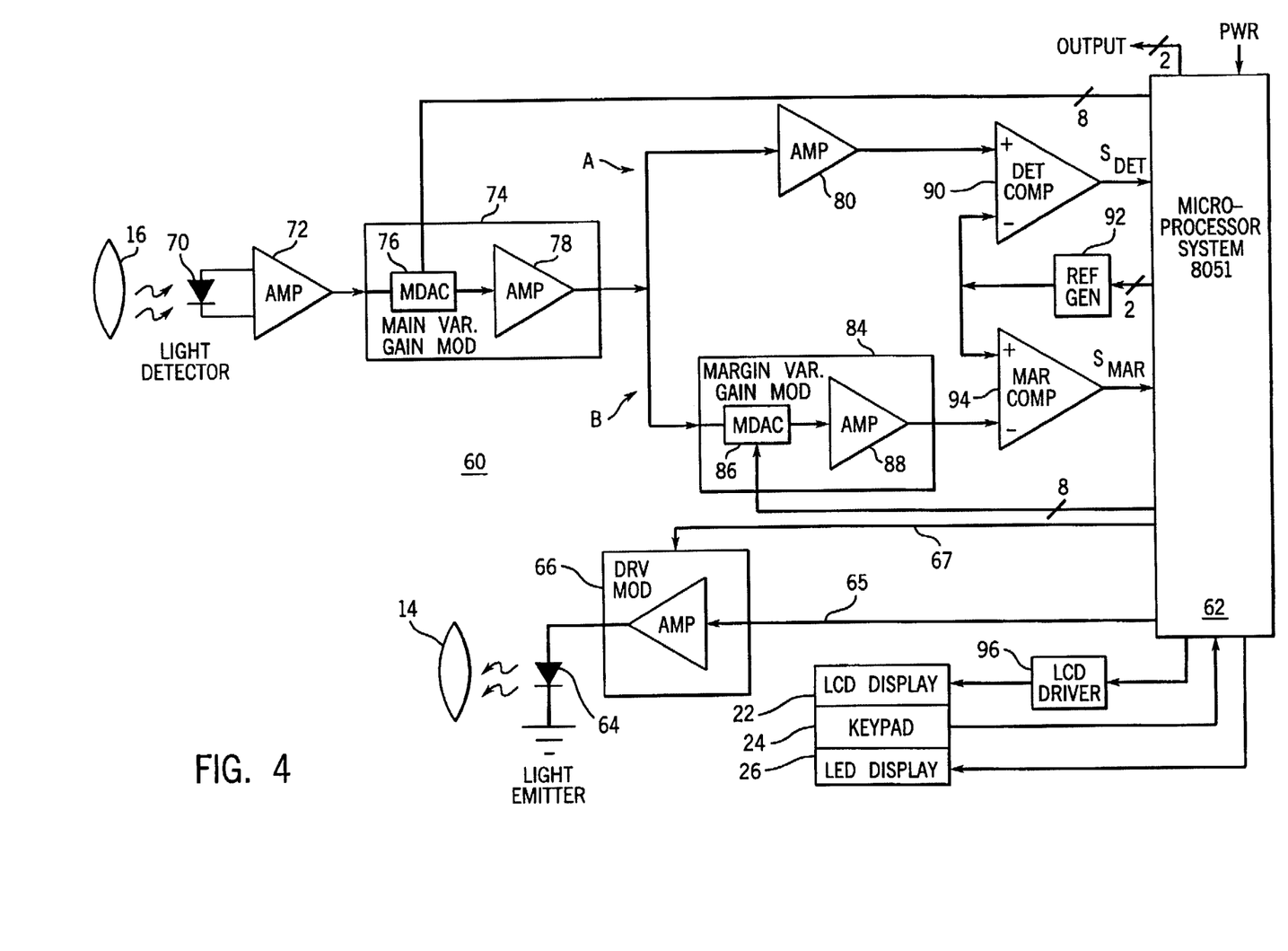
FIG. 4 provides a block diagram of an electronic system for use in a photoelectric control unit in accordance with the preferred embodiment of the present invention.

Referring now to FIG. 4, the electronic system 60 of the photoelectric control unit 10 of the present invention includes a microprocessor system 62 for executing a software program which regulates the overall operation of the unit 10. The system 60 also includes an LED 64 which emits periodically timed light pulses which are collimated by the lens 14 for output from the unit 10. The light pulses are produced in response to pulses of current supplied to the LED 64 from the current driver module 66 which operates under control of the microprocessor system 62. The light emitted by the diode 64 and returned to the unit 10 may be focused by the lens 16 as it is received for pickup by the photo diode 70. The microprocessor system 62 regulates both the repetition rate and amplitude level of the current and resulting light pulses in response to the operator selecting a particular repetition rate pursuant to the option function corresponding to the OPT icon 49 in accordance with a predetermined Repetition Rate Table.

The photodiode 70 is connected to a fixed gain transimpedance amplifier 72 which provides low impedance on its input and converts the current signal of the photodiode 70 to a voltage signal which is then supplied to a main variable gain module 74. The main variable gain module 74 includes a multiplying digital-to-analog converter 76 which provides variable attenuation in response to control signals from the microprocessor system 62 and a fixed gain amplifier 78 which provides a further amount of signal gain. The output of the main variable gain module 74 is separately provided along a first channel A to a fixed gain amplifier 80 and along a second channel B to a margin variable gain module 84.

The fixed gain amplifier 80 provides output to a detection comparator 90 which compares the amplitude of the output of the amplifier 80 with the amplitude of a reference level supplied from a reference generator 92 under control of the microprocessor system 62. The detection comparator 90 produces the main light pulse detection signal SDET which is supplied to the microprocessor system 62 as an indication of reflected light received by the unit 10 corresponding to light pulses emitted by the LED 64. The reference generator 92 is controlled by the microprocessor system 62 to provide an output having four reference levels defining the small and large amounts of hysteresis which may be selected by the system operator in accordance with the hysteresis setting function. The margin variable gain module 84 includes a multiplying digital-to-analog converter 86 which provides variable attenuation in response to control signals from the microprocessor system 62 and a fixed gain amplifier 88. The margin variable gain module 84 provides an output to the margin comparator 94 which compares the amplitude of this signal with the amplitude of the reference signal supplied from the reference generator 92. The margin comparator 94 provides a margin signal SMAR to the microprocessor system 62 which is useful in determining operating margin levels.

Channel A (including the amplifier 80 and detection comparator 90), Channel B (including the margin variable gain module 84 and the margin comparator 94) and the main variable gain module 74 provide an architecture which can be regulated by the microprocessor 62 under software control for identifying operating margin levels over a broad range of values and then automatically setting the gain of the system 74 for optimum detection results. The system 60 also includes the electronic components associated with the display 22, the keypad 24 and the LED display 26. The display 22 is driven by a LCD driver 96 for displaying output from a microprocessor system 62 in accordance with the icons, numerals and associated functions previously described. The keypad 24 provides input to the microprocessor system 62 in coordination with the icons displayed by the LCD display and their associated functions. The LED display 26 supplies visual outputs from the microprocessor system 62 indicating basic operational characteristics as previously described.

Figure 5:
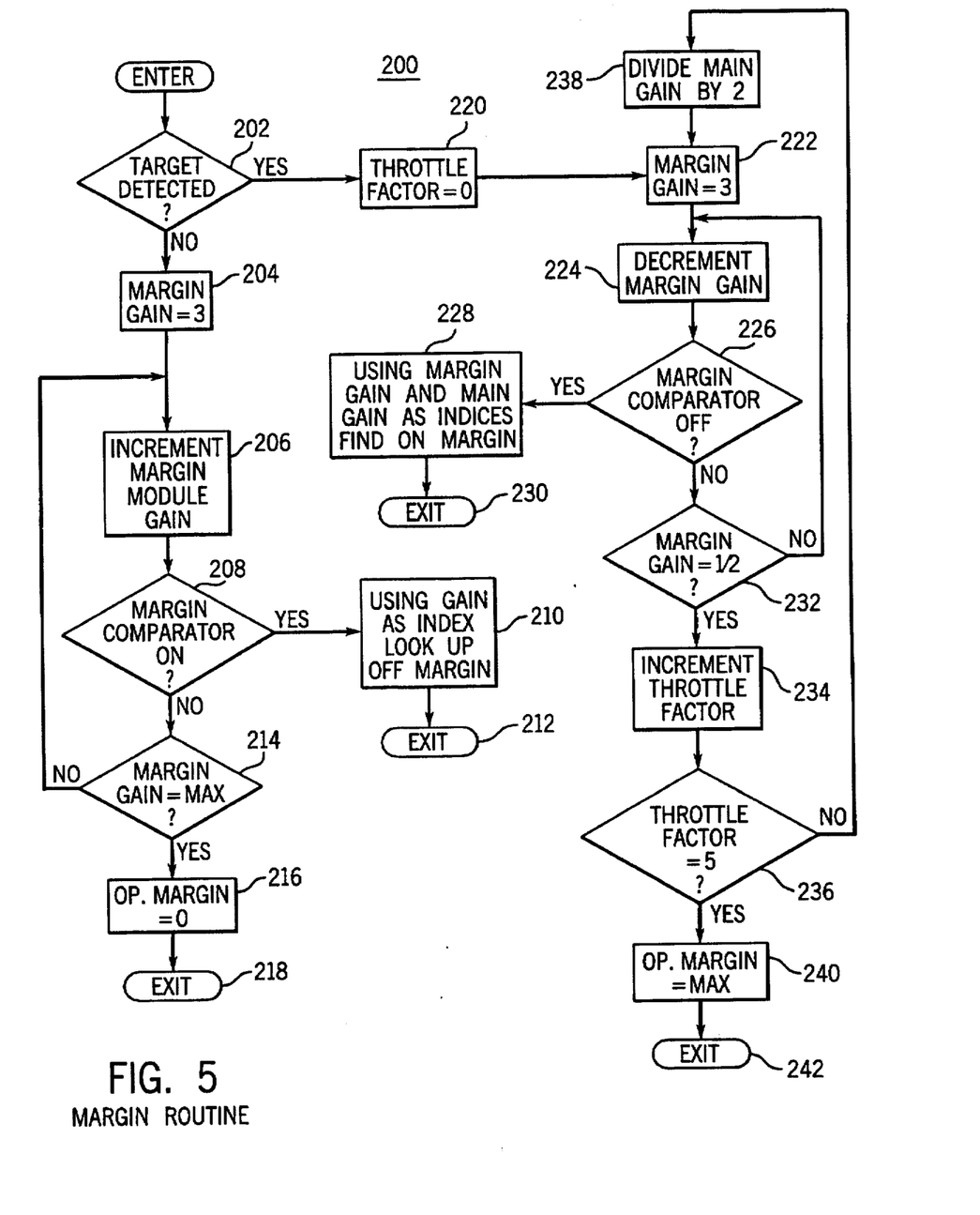
FIG. 5 provides a flow chart of the process for determining operating margin in accordance with the dual channel architecture of the present invention.

Referring now to FIG. 5, the margin routine 200 is operative for detecting the operating margin of the photoelectric control unit 10 by manipulating the gains of the variable gain modules 74 and 84 and following the output of the margin comparator 94. In step 202 the program queries whether the object at which the photoelectric control unit 10 is targeted is being detected as indicated by the output SDET of the detection comparator 90 in order to make a branching decision.

When the target is not detected, the gain of the margin variable gain module 84 is set to three in accordance with step 204 by adjusting the attenuation of the multiplying digital-to-analog converter 86. The program then proceeds to step 206 in which the gain of the module 84 is incremented by an amount that varies in accordance with gain level to provide a linear scale for margins of less than 1.

In step 208 the program queries whether the margin comparator 94 is on as indicated by its output signal SMAR. When the margin comparator 94 is on, the program is directed to step 210 in which it uses the current value of the gain margin as an indice to look up a value for the operating margin. The program can then terminate in accordance with block 212. On the other hand when the margin comparator 94 is not on, the program then queries whether the gain margin is at its maximum level in accordance with step 214 in order to make a branching decision. If the gain of the margin module 84 is not at maximum level, the program jumps back to step 206. However, when the gain of the margin module 84 is at its maximum level, the program sets the operating margin value to zero in step 216 and terminates in accordance with block 218. The steps 206, 208 and 214 establish a loop by means of which the gain margin is increased step by step until the margin comparator 94 is turned on. The gain level for the margin variable gain module 84 required to turn the margin comparator 94 on provides a reference for determining the operating margin of the photoelectric control unit 10.

Returning now to step 202, when a target object is detected, the program proceeds to steps 220 and 222 in which a "throttle factor" counter is set to zero and the margin variable gain is set to three by adjusting the attenuation of the multiplying digital-to-analog converter 86. The throttle factor corresponds to the gain of the main variable gain module 74 (the "main gain") which is adjustable in accordance with step 238 at five levels.

Thereafter, the program proceeds to step 224 in which the gain of the module 84 is decremented by an amount that varies in accordance with gain level to provide a nonlinear scale in accordance with the Gain Margin Table. In step 226 the program queries whether the margin comparator 94 is off as indicated by its output signal SMAR. When the margin comparator 94 is off, the program is directed to step 228 in which it uses the current value of the gain and the current value of the throttle factor to look up a value for the operating margin. The program then terminates in accordance with block 230.

Alternately, when the margin comparator 94 is on, the program then queries whether the gain is equal to one-half in order to prevent the gain from being reduced to the point where saturation conditions may affect the amplifiers in the system 60. Where the gain is not equal to one-half, the program jumps back to step 224 whereby the gain is again decremented. If, on the other hand the gain margin is equal to one-half, the program passes to step 234 in which it increments the throttle factor corresponding to different levels of main gain. Thereafter, in step 236 the program queries whether the throttle factor is now equal to five in order to make a branching decision. When the throttle factor is not equal to five, the program proceeds to step 238 in which the gain of the main variable gain module 74 is reduced to one-half its current level by adjusting the attenuation of the multiplying digital-to-analog converter 76. The program then passes back to step 222 and subsequent steps whereby the gain level of the margin variable module 84 is manipulated in steps corresponding to the entries of the Gain Margin Table in an attempt to again get the margin comparator 94 to turn off. However, if in step 236 the throttle factor is determined to be equal to five, the program sets the value of the operating margin to its maximum level in step 240 and terminates in accordance with step 242.

Steps 234, 236 and 238 provide a first loop for throttling down the main gain of the system 60 through five levels to avoid saturation effects which may be affecting the system amplifiers while steps 222, 224, 226 and 232 provide a second loop for reducing the gain margin step by step until the margin comparator turns off. The levels of the main gain (or the throttle factor) and the gain margin can then be used as indices for looking up a value for the operating margin of the photoelectric control unit 10.

Margin Processing and Display

Figure 6:
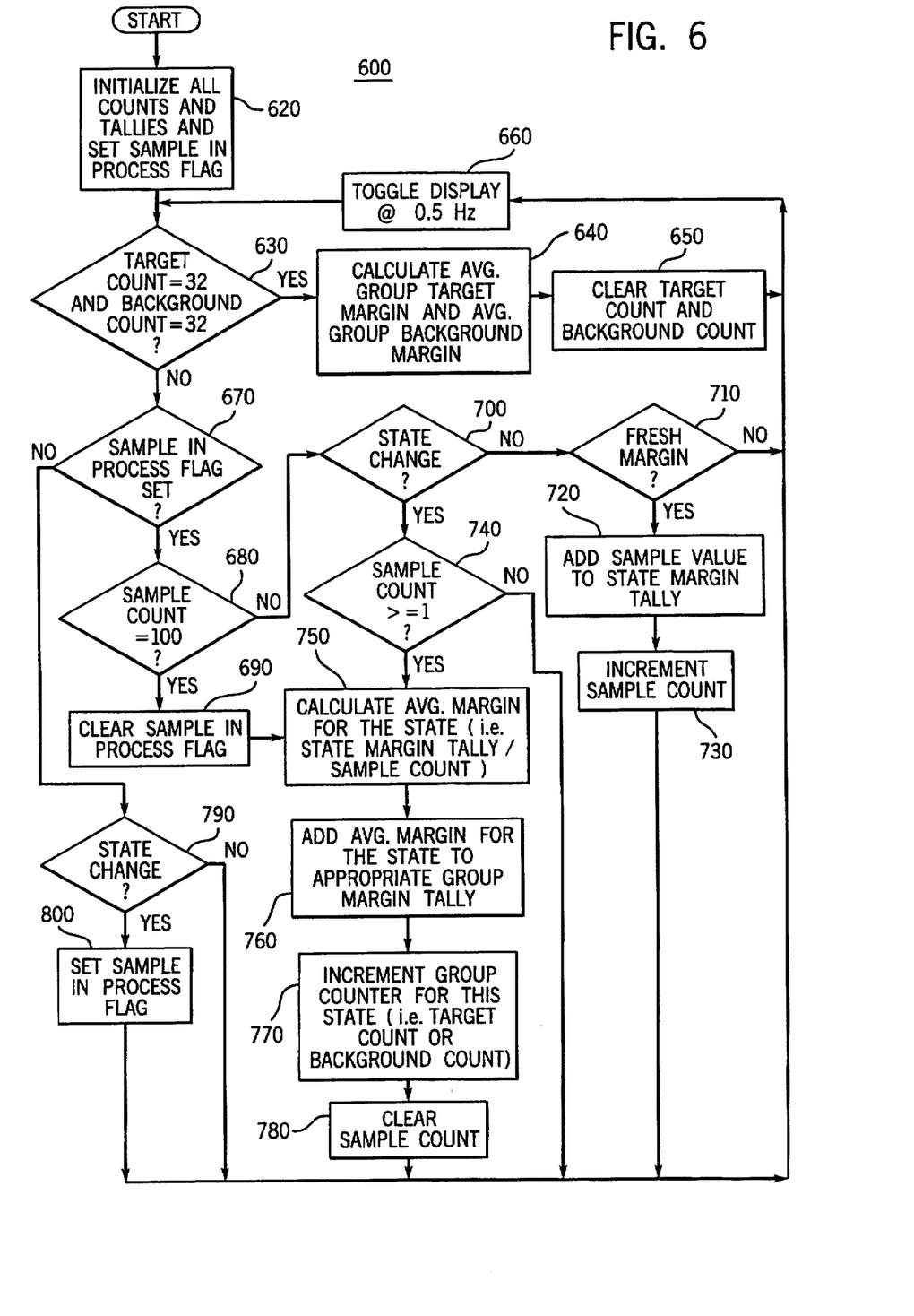
FIG. 6 provides a flow chart of the process for alternately displaying target and background margin in accordance with the preferred embodiment of the present invention.

Reference is now made to FIG. 6 which depicts a flow chart of the method of alternately displaying margin information 600 of the present invention. The process begins at step 620 wherein the Target Count, Background Counts, Sample Count, State Margin Tally, Target Margin Tally and Background Margin Tally are cleared and the Sample in Process Flag is set. Thereafter, the Target and Background Counts are compared with a predetermined group number in step 630. In FIG. 6, the predetermined group number is 32 however it could be any integer. When either the Target or Background Count is less than the predetermined group number the process advances to step 670. Alternatively, when the Target Count and Background Count both equal the predetermined group number the Average Group Target Margin and Average Group Background Margin are calculated in process step 640. The Average Group Target Margin or the Average Group Background Margin is simply the Group Target Margin Tally or the Group Background Margin Tally divided by the predetermined group number, respectively. The margins calculated in process step 640 are the average margins for a group of targets and backgrounds and could, for example, represent the margins for 32 parts (i.e. targets) and the spaces between the parts (i.e. backgrounds). After the average group margins are calculated in process step 640, both the Target Count and Background Count are cleared in process step 650. Thereafter, the process reverts to process step 660 where the most current Average Group Target and Average Group Background Margins calculated in step 640 are alternately displayed at a predetermined periodic rate. Importantly, the predetermined periodic rate (0.5 Hz in the preferred embodiment) is decoupled from the process rate. Specifically, the predetermined periodic rate is not dependent on Target or Background Counts.

The remaining steps in process 600 are directed toward compiling margin samples for targets and backgrounds until the Target and Background Count reach the predetermined group number. Specifically, when the Target Count or Background Count is less than the predetermined group number in process step 630 a decision is made in step 670 as to whether a sample is in process (i.e. that margin samples are being processed). When a sample is in process, process 600 branches to decisional block 680 wherein a check is performed to determine whether the Sample Count is equal to 100. The Sample Count is the number of margin samples that have been acquired for a particular target or background. When Sample Count reaches 100 the Sample in Process Flag is cleared in process step 690. The sample count is given as 100 in FIG. 6, however it may be any integer. Alternately, when the Sample Count is less than 100 process 600 advances to decisional block 700 wherein a determination is made as to whether a state change has occurred since the last margin sample. A state change occurs when the edge of a target is crossed and the margin sample value changes significantly. In the preferred embodiment a target is margin of 1 or greater while a background is margin of less than 1. Thus, if the most recently acquired margin sample is 1 or greater and the previous margin sample was less than 1 a trailing edge has occurred, that is the target has left the field of view and a state change has occurred. Likewise if the most recently acquired margin sample is near 0 and the previous margin sample was 1 or greater a state change has occurred.

The above example assume a diffuse style sensor. In the case of a reflex sensor, a transition of margin from 1 or greater to less than 1 occurs when the target blocks the beam and hence would be the leading edge of the target. In any event the present invention is intended for use in either a reflex or diffuse type photoelectric control unit.

In the event a state change has not occurred, a further determination is made at process step 710 as to whether the most recent margin sample is fresh (i.e. newly updated since the last loop through this step). In particular, an old margin may be present in the case where process 600 loops faster than the amount of time it takes to make a margin measurement. In this case where the margin sample is not fresh process 600 continues back to process step 610 through display step 660. Alternately, when no state change has occurred at step 700 and the margin is fresh the Margin Sample Value is added to the State Margin Tally at process step 720 and the Sample Count is incremented by one. Thereafter, process 600 reverts back to display step 660.

When a state change has occurred at step 700 (i.e. a change from target to background or vice versa), the Sample Count is evaluated at step 740 and when the sample count is greater than or equal to one an average margin value for that state (either target or background) is calculated at step 750. Specifically, the State Margin Tally is divided by the Sample Count to produce an average margin value for the state. Thereafter, the average margin value for the state is added to the appropriate group margin tally in step 760, the Group Counter for that state (target or background counter) is incremented by one in step 770 and the Sample Count is cleared in step 780. Additionally, as discussed above the average margin for a state can be calculated prior to a state change being made. Specifically, when the Sample Count reaches 100 prior to a state change occurring, it is safe to assume enough margin samples have been acquired to make an accurate determination of the margin for that particular target or background state. Accordingly, process steps 700 and 740 are skipped and the average margin for the state is calculated directly.

Reverting back to decisional step 670 when there is no sample in process (i.e. the sample in process flag is clear) the process advances to decisional step 790. The Sample in Process Flag is clear when 100 margin samples for the state have been taken and the average margin value has been calculated for the state but the state has not yet changed. In this case, process 600 is waiting for a state change to occur so it can begin gathering margin sample values for the new state. Accordingly, process 600 loops through process steps 630, 670 and 660 until a state change occurs at which time the Sample in Process Flag is set in process step 800.

Figure 7:
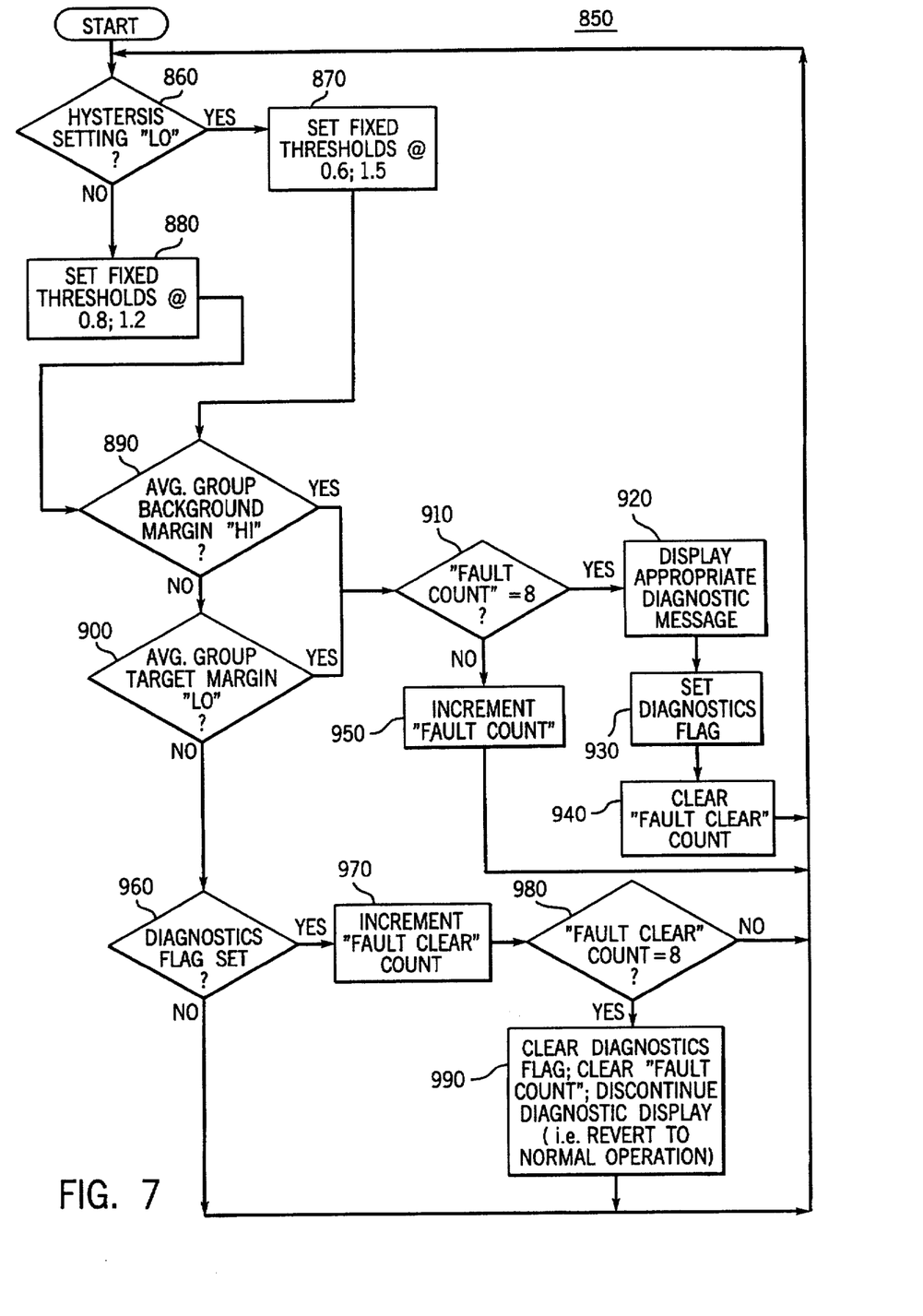
FIG. 7 provides a flow chart of the process of displaying diagnostic information in accordance with the preferred embodiment of the present invention.

FIG. 7 is illustrative of the method for displaying diagnostic information 850 based upon margin measurements. Specifically, in step 860 the Hystersis setting is examined such that proper Fixed Thresholds are set. In the preferred embodiment, the Fixed Thresholds for the Average Group Background Margin is 0.8 if operating with small hystersis or 0.6 if operating with large hystersis. Similarly, in the preferred embodiment, the Fixed Thresholds for the Average Group Target Margin is 1.5, if operating with large hystersis or 1.2, if operating with small hystersis. Accordingly, when the Hystersis Setting is low process 850 advances to step 870 where the Fixed Thresholds for the background and target margins are set to 0.6 and 1.5 respectively. Alternately, when the Hystersis Setting is not low process 850 advances to step 880 where the Fixed Thresholds for the background and target margins are set to 0.8 and 1.2 respectively. Thereafter, the Average Group Target Margin and Average Group Background Margin are compared to the appropriate Fixed Thresholds in steps 890 and 900 for the purpose of determining whether a diagnostic output should be activated. When the Average Group Target Margin is less than 1.5 or 1.2 (depending on the hystersis setting), the scene is judged unstable. Alternately when the Average Group Background Margin is greater than 0.6 or 0.8 (depending on the Hystersis Setting), the scene is judged unstable. As shown in process steps 910-940 when eight unstable scenes (targets or backgrounds) are detected a diagnostic output is activated. However, when the scene is stable, process 850 proceeds to step 960 where the "Diagnostics Flag" is checked. When the Diagnostics Flag is set (i.e. eight unstable scenes have previously occurred), a sequence of eight stable targets or backgrounds will cause the diagnostic output to be deactivated as shown in process steps 970-990.

There are two possible diagnostic messages which may be generated in step 920. For example, when the sensor lens 14 becomes dirty, less light reaches the detector. At some point, the amount of light reflected by the target will just barely be enough to detect the target. In this case display 40 will alternately display in successive order the following three blocks of information—"1.3"—"is"—"Lo"—which indicates that the Average Group Target Margin of 1.3 is low. Alternately, in the case where the background light is too high the display 40 will display the following information in successive order—"0.8"—"is"—"Hi"—which indicates that the Average Group Background Margin of 0.8 is too high. Finally, upon completion of any of process steps 940, 950, or 990 or upon a negative determination in process steps 960 or 980 process 850 reverts back to step 860. Additionally, the process of displaying diagnostic information may be directly incorporated within display process 600 wherein step 660 therein encompasses the entire process 850.

The processes discussed above may also be embodied in hardware. Specifically, a target counter, background counter, state margin tally register and sample counter may be incorporated within microprocessor 62 where the above mentioned process steps are encoded in software or firmware as is well known in the art.

In use the alternating display is particularly beneficial when used to align the photoelectric control unit. Specifically, the unit can be manually adjusted while visually inspecting the alternating target and background margins on display 40 until the target and background margins attain optimal values.

While particular embodiments of the present invention have been shown and described, it should be clear that changes and modifications may be made to such embodiments without departing from the true scope and spirit of the invention. It is intended that the appended claims cover all such changes and modifications. In particular, alternately displaying background and target margin information has been described in reference to a particular photoelectric control unit described in a plurality of issued U.S. patents incorporated by reference to the present application, however, such present invention is not limited to those particular embodiments. Specifically, an alternate embodiment of the present invention is such that the photoelectric detection unit comprised of two separate units where the first unit comprises an emitter of light pulses and a second, physically separate, unit comprises the photoelectric detector and display apparatus.

We claim:

1. In a photoelectric control unit for detecting targets and backgrounds in a process operating at a process speed, said unit comprising a microprocessor, a light source connected to said microprocessor for generating light pulses, a photodetector arranged for detecting return light pulses originating from said light source and providing a photoelectric output signal, a display apparatus comprising:

means for generating an average target margin and an average background margin for a predetermined number of targets and backgrounds based upon said output signal; and an alternating display unit, said display connected to said means for generating an average target margin and an average background margin and alternately displaying said margins.

2. The photoelectric control unit according to claim 1 wherein said display unit displays said average target margin and said average background margin at a rate which is decoupled from said process speed.

3. The photoelectric control unit according to claim 1 further comprising a means for generating diagnostic information connected to said alternating display unit, said diagnostic information comprising alpha-numeric data which indicates when said unit is operating outside predetermined margin thresholds.

4. In a photoelectric control unit for detecting targets and background in a process operating at a process speed, said unit comprising a first component for generating light pulses and a second component comprising a photodetector arranged for detecting light pulses originating from said first component connected to a microprocessor, said microprocessor providing an output signal to a display apparatus said display apparatus comprising:

means for generating average margins generating an average target margin and an average background margin for a predetermined number of targets and backgrounds based upon said output signal; and an alternating display unit, said display unit connected to said means for generating average margins and alternately displaying said margins average target margin and average background margins.

5. The photoelectric control unit according to claim 4 wherein said display unit displays said average target margin and said average background margin at a rate which is decoupled from said process speed.

6. The photoelectric control unit according to claim 4 further comprising a means for generating diagnostic information connected to said alternating display unit, said diagnostic information comprising alpha-numeric data which indicates when said unit is operating outside predetermined margin thresholds.

7. A method for processing and displaying background and target information in a photoelectric control unit, the method comprising:

generating a plurality of margin measurements for a predetermined number of targets and backgrounds;

averaging said plurality of margin measurements to produce average target margin and an average background margin; and alternately displaying said average target margin and said average background margin.

8. The method as set forth in claim 7, wherein said average target margin and said average background margin are displayed at a rate which is decoupled from said process speed.

9. The method as set forth in claim 7, further comprising the steps of:

comparing said average target margin to a predetermined target margin threshold and displaying a diagnostic output when said average target margin is less than said predetermined target margin threshold; and comparing said average background margin to a predetermined background margin threshold and displaying a diagnostic output when said average background margin is greater than said predetermined background margin threshold.

10. The method as set forth in claim 7, further comprising the steps of:

comparing said average target margin to a predetermined target margin threshold and displaying a diagnostic output when said average target margin is greater than said predetermined target margin threshold; and comparing said average background margin to a predetermined background margin threshold and displaying a diagnostic output when said average background margin is less than said predetermined background margin threshold.

* * * * *